United States Patent [19]

Inokuchi et al.

[11] Patent Number: 5,411,761

[45] Date of Patent: May 2, 1995

[54] PROCESS OF PRODUCING HYDROPHOBIC TITANIUM OXIDE FINE PARTICLE

[75] Inventors: Yoshinori Inokuchi; Satoshi Kuwata, both of Annaka, Japan

[73] Assignee: Shin-Etsu Chemical Co., Ltd., Tokyo, Japan

[21] Appl. No.: 18,554

[22] Filed: Feb. 17, 1993

[30] Foreign Application Priority Data

Feb. 17, 1992 [JP] Japan ................................. 4-061167

[51] Int. Cl.6 .............................................. B05D 7/00
[52] U.S. Cl. .................... 427/220; 427/212; 427/215
[58] Field of Search .................. 427/220, 212, 215

[56] References Cited

U.S. PATENT DOCUMENTS

| | | | |
|---|---|---|---|
| 4,015,031 | 3/1977 | Reinhardt et al. | 427/220 |
| 4,073,972 | 2/1978 | Nestler et al. | 427/299 |
| 4,828,954 | 5/1989 | Hashimoto et al. | 430/110 |

FOREIGN PATENT DOCUMENTS 57-200306 12/1982 Japan .

*Primary Examiner*—Shrive Beck
*Assistant Examiner*—David M. Maiorana
*Attorney, Agent, or Firm*—Oblon, Spivak, McClelland, Maier & Neustadt

[57] ABSTRACT

A process of producing hydrophobic titanium oxide fine particles, comprising the steps of dispersing titanium oxide fine particles in an aqueous alkaline solution, adding a trialkoxysilane to the resulting dispersion in an amount of 1 to 1,000 parts by weight per 100 parts by weight of the titanium oxide fine particles, and carrying out the hydrolysis, whereby a film of a hydrolysis condensation product of the trialkoxysilane is formed on the surface of the titanium oxide fine particles. According to the present invention, titanium oxide fine particles can be treated quite effectively to be rendered hydrophobic without damaging the powdery nature of the titanium oxide.

6 Claims, No Drawings

PROCESS OF PRODUCING HYDROPHOBIC TITANIUM OXIDE FINE PARTICLE

BACKGROUND OF THE INVENTION

1. Field of the Invention

The present invention relates to a process of producing titanium oxide fine particles excellent in hydrophobicity.

2. Description of the Prior Art

Titanium oxide fine particles are widely used as a white pigment or an additive, for example, in cosmetics, paints, inks, various synthetic resin molded items, synthetic resin films, and toners for electrophotography. Since these titanium oxide fine particles are required to have dispersibility in various resins, lubricants, and the like, it is needed that the hydrophobicity is good.

Hitherto, for the treatment of rendering titanium oxide fine particles hydrophobic, a silicone oil is often used. As the method of treating titanium oxide fine particles to render them hydrophobic, for example, a method wherein titanium oxide fine particles are coated directly with various alkylpolysiloxanes or are coated with an emulsion of various alkylpolysiloxanes or a solution of various alkylpolysiloxanes in a solvent followed by drying and then baking (Japanese Patent Publication (kokoku) No. 49-1769 ( 1974 ) and Japanese Pre-examination Patent Publication (kokai) No. 56-16404 (1981)), a method wherein titanium oxide fine particles are coated directly with a hydrosilyl group-containing siloxane or are coated with a solution of a hydrosilyl group-containing siloxane in a solvent followed by drying and then baking (Japanese Pre-examination Patent Publication (kokai) No. 57-200306 (1982)), a method wherein titanium oxide powder brought in contact with a vapor of a hydrosilyl group-containing cyclic siloxane so that a silicone polymer is supported on the powder surface (Japanese Pre-examination Patent Publication (kokai) No. 3-163172 (1991)), and a method wherein titanium oxide fine particles are directly coated with an alkoxysilane or are coated with a solution of an alkoxysilane in a solvent and then the coated titanium oxide fine particles are treated with water or steam to effect the hydrolysis condensation to form a film of a condensation product (Japanese Preexamination Patent Publication (kokai) No. 57-200306 (1982) are known.

However, any of the above methods is difficult to render titanium oxide fine particles hydrophobic satisfactorily because the amount of the silicone for the surface treatment is small and the chemical adhesion of the surface treatment film is weak.

Therefore, to give satisfactory hydrophobicity, a method wherein a large amount of a silicone oil is blended with titanium oxide powder is suggested (Japanese Preexamination Patent Publication (kokai) No. 54-14528 (1979), but, in this method, although the hydrophobicity becomes satisfactory, the obtained surface-treated powder particles agglomerate due to the large amount of the silicone oil, resulting in a state which cannot be called a powdery state.

SUMMARY OF THE INVENTION

Therefore an object of the present invention is to provide a process capable of rendering titanium oxide fine particles satisfactorily hydrophobic wherein the amount of a surface treatment is easily controlled and the powdery nature is not damaged.

According to the present invention, there is provided a process of producing hydrophobic titanium oxide fine particles, comprising the steps of dispersing titanium oxide fine particles in an aqueous alkaline solution, adding a trialkoxysilane in an amount of 1 to 1,000 parts by weight per 100 parts by weight of the titanium oxide fine particles to the resulting dispersion, and carrying out the hydrolysis, whereby a coating of a hydrolysis condensation product of the trialkoxysilane is formed on the surface of the titanium oxide fine particles.

DETAILED DESCRIPTION OF THE INVENTION

Preparation of an Alkaline Dispersion

According to the present process, first, titanium oxide fine particles are dispersed in an aqueous alkaline solution.

The crystalline structure of the titanium oxide to be used are not particularly restricted and any crystalline structures, for example, the anatase structure or the rutile structure can be used. Although the particle shape is not particularly restricted, generally spheres are preferable, and their particle diameter is preferably in the range of 0.001 to 200 $\mu$m, particularly 0.01 to 10 $\mu$m.

Further, preferably the amount of titanium oxide fine particles to be used is in the range of 1 to 60 parts by weight, particularly 5 to 30 parts by weight, per 100 parts by weight of the aqueous alkaline solution. That is, if the amount is less than 1 part by weight, the efficiency of the treatment for hydrophobicity is quite poor, while if the amount is over 60 parts by weight, since the viscosity of the formed alkaline dispersion becomes too high, the below-mentioned hydrolysis condensation product of a trialkoxysilane becomes difficult to be formed uniformly on the titanium oxide fine particles, and in some cases the titanium oxide particles agglomerate and fuse.

The aqueous alkaline solution used for dispersing the above titanium oxide fine particles is used to facilitate the hydrolysis condensation of a trialkoxysilane and preferably the pH is in the range of 10.0 to 13.0, particularly 10.5 to 12.5. If the pH is lower than 10.0, the hydrolysis condensation of the trialkoxysilane does not proceed satisfactorily, which, in some cases, causes the particles to fuse each other. On the other hand if the pH is higher than 13.0, since the hydrolysis rate of the trialkoxysilane becomes too high, said hydrolysis condensation takes place in places other than the titanium oxide particle surfaces and it becomes difficult to produce efficiently the hydrolysis condensation product of the trialkoxysilane on the titanium oxide particle surface.

An alkaline substance from which the above aqueous alkaline solution is formed may be an arbitrary one so long as it has a catalytic action on the hydrolysis condensation reaction of a trialkoxysilane and generally use is made, for example, of an alkali metal hydroxide such as potassium hydroxide, sodium hydroxide, and lithium hydroxide, an alkali earth metal hydroxide such as calcium hydroxide and barium hydroxide, an alkali metal carbonate such as potassium carbonate and sodium carbonate, ammonia, amines such as monomethylamine, dimethylamine, monoethylamine, diethylamine, and ethylenediamine, and a quaternary ammonium hydroxide such as tetremethylammonium hydroxide. Especially, ammonia is the most preferable because it is excellent in solubility in water and catalytic activity and can be easily removed from the powder by causing it to volatilize, and it is preferable to prepare an aqueous alkaline solution using an aqueous ammonia solution (concentration: 28% by weight) that is commonly commercially available.

To disperse titanium oxide fine particles, it is also possible that the titanium oxide fine particles are previously dispersed in water and thereafter an alkaline substance or an aqueous alkali solution is added to bring the pH to the above-described prescribed pH.

Trialkoxysilanes

According to the present invention, a trialkoxysilane is added to the above-described alkali dispersion of titanium oxide and the hydrolysis condensation reaction is carried out.

As the trialkoxysilane, a trialkoxysilane is used which is represented by the following general formula (1):

$$R^1Si(OR^2)_3 \qquad (1)$$

wherein $R^1$ represents a monovalent organic group selected from the group consisting of an alkyl group having 1 to 6 carbon atoms such as a methyl group, an ethyl group, a propyl group, and a butyl group, an aryl group such as a phenyl group, an alkenyl group such as a vinyl group and an ally group, a monovalent organic group having at least one group of an amino group, an epoxy group, and a vinyl group, and corresponding groups in which part or all of the hydrogen atoms of the above monovalent groups have been replaced with a halogen atom(s) or the like and $R^2$ represents an alkyl group having 1 to 6 carbon atoms such as a methyl group, an ethyl group, a propyl group, and a butyl group, and, for example, methyltrimethoxysilane, methyltriethoxysilane, methyltripropoxysilane, methyltributoxysilane, ethyltrimethoxysilane, propyltrimethoxysilane, butyltrimethoxysilane, N-(β-aminoethyl)-γ-aminopropyltrimethoxysilane, γ-glycidoxypropyltrimethoxysilane, vinyltrimethoxysilane, phenyltrimethoxysilane, 3,3,3-trifluoropropyltrimethoxysilane, 3,3,4,4,5,5,6,6,6-nonafluorohexyltrimethoxysilane, and 3,3,4,4,5,5,6,6,7,7,8,8,9,9,10,10,10-heptadecafluorodecyltrimethoxysilane can be used singly or as a mixture of two or more. In the present invention, methyltrimethoxysilane is particularly preferable.

In the present invention, desirably the trialkoxysilane is used in an amount of 1 to 1,000 parts by weight, particularly 3 to 300 parts by weight, per 100 parts by weight of the titanium oxide fine particles. For example, if the amount to be used is less than 1 part by weight, it is difficult to render the titanium oxide fine particles hydrophobic satisfactorily, while if the amount to be used exceeds 1,000 parts by weight, masses occur and particles made up of a silicone only which is a hydrolysis condensation product are formed, which are unpreferable.

Further, in the present invention, it is desirable that the amount of the trialkoxysilane to be used satisfies the above condition and also is 30 parts by weight or less, particularly 20 parts by weight or less, per 100 parts by weight of the aqueous alkali solution. If the trialkoxysilane is used in an amount greater than that, there is also a possibility that masses occur.

Hydrolysis Consensation Reaction

The hydrolysis condensation reaction with the trialkoxysilane added is carried out with stirring so that the titanium oxide fine particles may not be settled. In this case, if the stirring is too intense, the particles are inclined to agglomerate or fuse together where the amount of the used trialkoxysilane is large, and therefore the stirring is preferably carried out under mild conditions as far as possible. As an agitating machine to be used, generally a propeller blade, a flat plate blade, or the like is preferable.

The reaction temperature is preferably in the range of 0° to 60° C., particularly 5° to 20° C. If the temperature is lower than 0° C., the liquid will coagulate, while if the temperature is higher than 60° C., the hydrolysis condensation product does not adhere efficiently to the titanium oxide fine particle surfaces and therefore the intended treatment for hydrophobicity cannot be carried out effectively. Further, in some cases, agglomeration or fusing of the particles may occur.

The addition of the trialkoxysilane in the hydrolysis condensation reaction is desirably carried out little by little over a long period of time if the amount of the trialkoxysilane is large because if a large amount of the trialkoxysilane is added at a time, in some cases, the particles may agglomerate or fuse together. In this case, by selecting suitably the kind of the trialkoxysilane to be added lastly, it is possible to make the surface of the formed coating adhered to the titanium oxide fine particle surface have functional Groups. Further, after the completion of the addition of the trialkoxysilane, although it is recommendable to continue the stirring for a little while until the hydrolysis condensation reaction is completed, it is also possible to carry out heating to complete the hydrolysis condensation reaction. Further, optionally, an acid substance may be added to carry out neutralization.

Following the completion of the reaction, optionally after washing with water is carried out, the dispersion is thickened, for example, by heating for dehydration, filtering, centrifugal separation, or decantation and the water is removed, for example, by heat-treating the dispersion under normal pressures or reduced pressure, by spray-drying the dispersion into an air current, or by heat-treating the dispersion using a fluid heating medium, so that hydrophobic titanium oxide fine particles are obtained onto whose particle surface a coating of the hydrolysis condensation product of the trialkoxysilane adheres.

Although the obtained hydrophobic titanium oxide fine particles are in a hardly agglomerated state and retain a powdery state effectively, if part of them are in a agglomerated state, it is possible to disintegrate them by a grinder such as a jet mill and a ball mill to adjust the particle size.

Since the obtained hydrophobic titanium oxide fine particles have on their surface a coating of the hydrolysis condensation product of the trialkoxysilane that is thick enough to exhibit hydrophobicity and is strong in chemical adhesion and therefore are excellent in water repellency and also excellent in dispersibility in organic resin materials, they are quite useful, for example, as an additive and a colorant to be added, for example, to cosmetics, paints, inks, various synthetic resin molded items, synthetic resin films, synthetic fibers, and toners for electrophotography.

EXAMPLES

Example 1

4020 g of water and 95 g of ammonia water (concentration: 28% by weight) were charged into a 5-liter glass container and they were stirred under conditions with the blade rotational frequency being 200 rpm and the water temperature being 7° C. At that time, the pH of the aqueous solution was 11.4.

Into this aqueous solution, 376 g of spherical titanium oxide fine particles (particle diameter: 0.14 to 0.16 μm; anatase) was charged and dispersed and then 13 g of methyltrimethoxysilane was charged at a time.

Then, after the resulting mixture was stirred for 1 hour with its temperature kept at 5° to 10° C., it was heated to 75° to 80° C. and was stirred for 1 hour, and the obtained slurry was made into a cake having a water content of about 30% by using a pressure-applied filter. The cake was dried in a dryer at a temperature of 105° C. and the thus dried product was disintegrated by a jet mill.

The obtained fine particles were observed under an electron microscope and it was confirmed that they were spherical particles having a particle diameter of 0.14 to 0.16 μm. The manufacturing conditions, the particle diameter of the obtained fine particles, etc. are summarized in Table 1.

2 g of the thus obtained hydrophobic titanium oxide fine particles was added to 80 g of water and the dispersed state of the fine particles in the water was observed immediately thereafter and after 24 hours. The results are shown in Table 2.

Examples 2 and 3

Example 1 was repeated, except that the amounts of water, ammonia water (concentration: 28% by weight), titanium oxide fine particles, and the methyltrimethoxysilane and the time used for charging the methyltrimethoxysilane were changed respectively as shown in Table 1, thereby preparing hydrophobic titanium oxide fine particles. The particle diameters of the obtained titanium oxide fine particles, etc. are also shown in Table 1. Similarly to Example 1, the dispersed state of the obtained fine particles in water was observed and the results are shown in Table 2.

TABLE 1

| Composition | Example 1 | Example 2 | Example 3 |
|---|---|---|---|
| Water (g) | 4020 | 4010 | 3870 |
| Ammonia water (g) | 95 | 95 | 90 |
| (pH of aqueous solution) | (11.4) | (11.4) | (11.2) |
| Titanium oxide fine particles (g) | 376 | 329 | 180 |
| Methyltrimethoxysilane (g) | 13 | 68 | 365 |
| Time used for charging methyltrimethoxysilane (min) | at a time | 15 | 75 |
| Particle diameter of produced particles (μm) | 0.14–0.16 | 0.14–0.16 | 0.35–0.38 |
| Shape of produced particles | spherical | spherical | spherical |

Comparative Example 1

Example 1 was repeated, except that the amount of the spherical titanium oxide fine particles used was changed to 381 g and the amount of the methyltrimethoxysilane used was changed to 3 g, thereby obtaining hydrophobic titanium oxide fine particles.

The obtained hydrophobic titanium oxide fine particles were observed under an electron microscope and they were found to be sphere particles having a particle diameter of 0.14 to 0.16 μm. Similarly to Example 1, the dispersed state of the obtained fine particles in water was observed and the results are shown in Table 2.

Comparative Example 2

To 500 g of spherical titanium oxide fine particles which were the same as those used in Example 1 was added 10 g of hexamethylsilazane, and they were heated to 75° to 80° C. and were mixed for 1 hour by using a Henschel mixer, thereby treating the titanium oxide fine particles to render them hydrophobic. Similarly to Example 1, the dispersed state of the obtained fine particles in water was observed and the results are shown in Table 2.

TABLE 2

| | Dispersed state immediately after the charging | Dispersed state after 24 hours |
|---|---|---|
| Example 1 | All the particles floated on the water surface. | All the particles floated on the water surface. |
| Example 2 | All the particles floated on the water surface. | All the particles floated on the water surface. |
| Example 3 | All the particles floated on the water surface. | All the particles floated on the water surface. |
| Comparative Example 1 | Part of the particles floated, but most of them sunk. | All the particles sunk to the bottom. |
| Comparative Example 2 | Part of the particles floated, but most of them sunk. | All the particles sunk to the bottom. |

As is apparent from the results in Table 2 above, it can be understood that the titanium oxide fine particles treated according to the present invention are quite excellent in hydrophobicity or water repellency.

Comparative Example 3

3640 g of water and 86 g of ammonia water (concentration: 28% by weight) were charged into a 5-liter glass container and they were stirred under conditions with the blade rotational frequency being 200 rpm and the water temperature being 7° C. At that time, the pH of the aqueous solution was 11.5.

Into this aqueous solution, 52 g of spherical titanium oxide fine particles that were the same as those used in Example 1 was charged and dispersed and then 624 g of methyltrimethoxysilane was charged thereinto over a period of 150 min.

Then, after the resulting mixture was stirred for 1 hour with its temperature kept at 5° to 10° C., the mixture was heated to 75° to 80° C. and was stirred for 1 hour. The thus obtained slurry contained a large amount of about 1 mm massive particles.

This slurry was made into a cake having a water content of about 30% by using a pressure-applied filter and the cake was dried in a dryer at a temperature of 105° C. and the dried product was disintegrated by a jet mill.

The obtained fine particles were observed under an electron microscope and it was confirmed that the obtained fine particles consisted of a mixture of indefinitely shaped particles having a particle diameter of 0.1 to 0.5 μm, spherical particles having a particle diameter of 0.4 to 0.5 μm, and spherical particles having a particle diameter of 1.6 to 1.8 μm.

We claim:

1. A process of producing hydrophobic titanium oxide fine particles, comprising the steps of dispersing titanium oxide fine particles in an aqueous alkaline solution having a pH of 10.0 to 13.0, adding a trialkoxysilane in an amount of 1 to 1,000 parts by weight per 100 parts by weight of the titanium oxide fine particles to the resulting dispersion, and carrying out the hydrolysis condensation reaction, whereby a coating of a hydrolysis condensation product of the trialkoxysilane is formed on the surface of the titanium oxide fine particles.

2. A process as claimed in claim 1, wherein, as said aqueous alkaline solution, an aqueous ammonia solution is used.

3. A process as claimed in claim 1, wherein the amount of the titanium oxide fine particles in said dispersion is 1 to 60 parts by weight per 100 parts by weight of the aqueous alkaline solution.

4. A process as claimed in claim 1, wherein as said trialkoxysilane, a compound represented by the following general formula:

$$R^1Si(OR^2)_3$$

wherein $R^1$ represents at least one group selected from the group consisting of an alkyl group having 1 to 6 carbon atoms; an aryl group; an alkenyl group; a monovalent organic group having at least one group selected from the group consisting of an amino group, an epoxy group, and a vinyl group; and corresponding groups in which part or all of the hydrogen atoms of the above monovalent groups have been replaced with a halogen atom(s) and $R^2$ represents an alkyl group having 1 to 6 carbon atoms is used.

5. A process as claimed in claim 4, wherein said trialkoxysilane is methyltrimethoxysilane.

6. A process as claimed in claim 1, wherein said trialkoxysilane is used in an amount of 30 parts by weight or less per 100 parts by weight of the aqueous alkaline solution.

* * * * *